(12) United States Patent
Fabris

(10) Patent No.: US 7,221,442 B2
(45) Date of Patent: May 22, 2007

(54) METHOD AND APPARATUS FOR ALIGNING EQUIPMENT IN A STEEL MILL

(76) Inventor: Mario Fabris, 188 North Service Road, Grimsby, ONT (CA) L3M 4E8

( * ) Notice: Subject to any disclaimer, the term of this patent is extended or adjusted under 35 U.S.C. 154(b) by 229 days.

(21) Appl. No.: 10/912,197

(22) Filed: Aug. 6, 2004

(65) Prior Publication Data

US 2005/0039513 A1    Feb. 24, 2005

(51) Int. Cl.
*G01B 11/26* (2006.01)
*B21B 39/20* (2006.01)

(52) U.S. Cl. ......................... 356/154; 72/250

(58) Field of Classification Search .......... 348/94–95, 348/143; 356/154, 401–399, 505, 615, 620
See application file for complete search history.

(56) References Cited

U.S. PATENT DOCUMENTS

| | | | | |
|---|---|---|---|---|
| 3,640,109 A | * | 2/1972 | Ashton et al. ................ 72/37 |
| 4,977,418 A | * | 12/1990 | Canty ........................... 396/19 |
| 5,701,015 A | * | 12/1997 | Lungershausen et al. . | 250/495.1 |
| 6,292,262 B1 | * | 9/2001 | Ciani et al. ................. | 356/505 |
| 6,631,287 B2 | * | 10/2003 | Newman et al. ............ | 600/474 |
| 6,685,317 B2 | * | 2/2004 | Su et al. ...................... | 351/206 |
| 6,926,429 B2 | * | 8/2005 | Barlow et al. .............. | 362/464 |
| 6,970,183 B1 | * | 11/2005 | Monroe ...................... | 348/143 |
| 2003/0197124 A1 | * | 10/2003 | Wood .......................... | 250/332 |

* cited by examiner

*Primary Examiner*—Gregory J. Toatley, Jr.
*Assistant Examiner*—Jarreas C. Underwood
(74) *Attorney, Agent, or Firm*—Edward H. Oldham

(57) ABSTRACT

An alignment device for aligning guiding apparatus with the main axis of a rolling mill comprising a camera and a video display communicating with the camera. The camera is mounted in the steel mill at the position of the guiding apparatus and the camera is moved until it is on the axis of the mill. The camera is then removed to a bench which duplicates the physical characteristics of the mill. The guiding apparatus is mounted on the bench adjacent the camera. The guiding apparatus is physically moved until it is located on the camera axis, which is the mill axis. The guiding apparatus is then remounted in the mill.

4 Claims, 4 Drawing Sheets

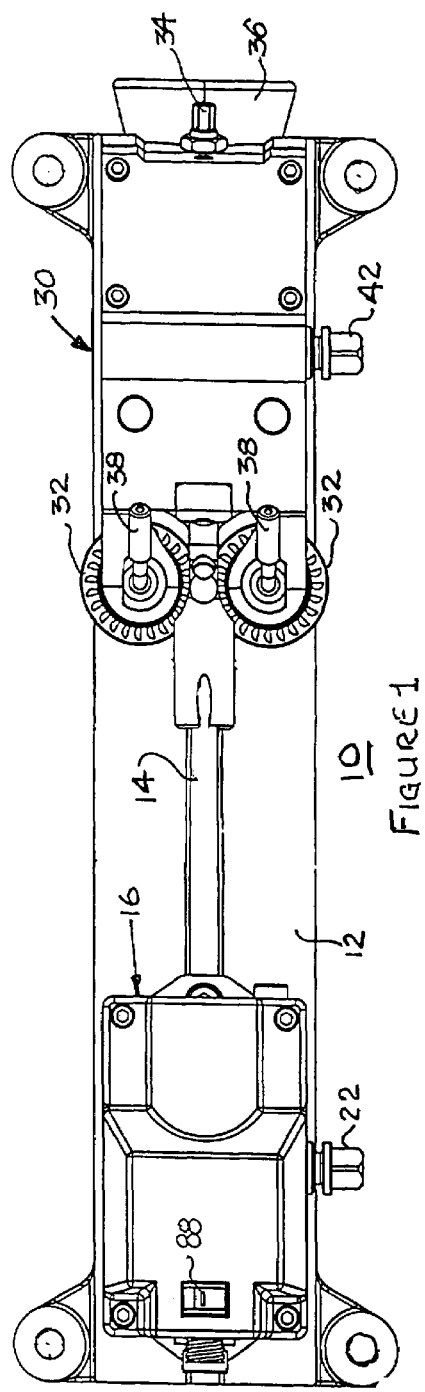
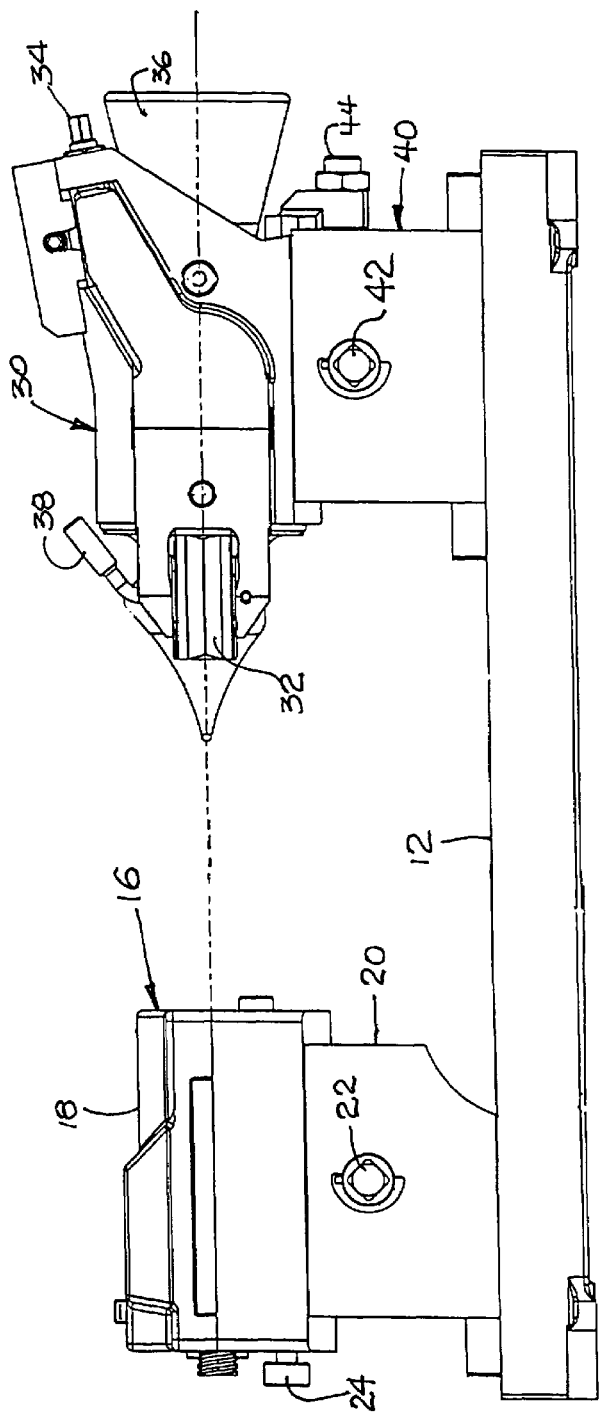

METHOD AND APPARATUS FOR ALIGNING EQUIPMENT IN A STEEL MILL

BACKGROUND OF THE INVENTION

Multi-stand rolling mills require critical alignment of the reducing rolls and the guiding devices which feed the work product to the reducing rolls. If for some reason, misalignment between the guide and reducing rolls occurs during a rolling process, the result is often a damaged or "off-gauge" product which may not be marketable. It is therefore essential to have the guiding device in exact alignment with the reducing rolls during a reduction process. Because of the location of the main reducing rolls and the low light levels existing at this location, the adjustment of the guide rolls to their proper setting can present a challenge to a mill technician.

Rolling mills traditionally present an environment which tends to be hostile for most alignment instruments. Usually alignment of the guides and reduction rolls must be accomplished in the shortest possible time under conditions which are less than ideal. The mill usually operates at an elevated temperature with coolant water being copiously applied to the surface of the guide rolls and the reduction rolls.

In most instances the "throat" of the guide is obscured by auxiliary apparatus and the levels of light existing at the guide throat and the main roller "nip" leaves a lot to be desired.

It is therefore seen that even if one was able to adjust the alignment of the guide and its rollers to the correct position to feed the reduction rolls of the mill, the adjustment procedure places an almost impossible task on the mill technician due to the fact that the critical zones of the mill i.e. the main roller gap and the guide throat are almost inaccessible to the human eye.

SUMMARY OF THE INVENTION

This invention makes use of cordless video camera mounted on a special base which is so shaped as to be received for mounting on the mill bed in the same manner and in the same place as the guide assembly which is usually mounted in the mill. The camera itself is completely self contained and contains its own power supply. Focal length adjustment is possible by a slide apparatus mounted in the camera which is activated from outside the camera. Illumination of critical areas of the mill is made possible by means of a plurality of infra red (IR) light sources powered by the camera battery and mounted on the camera housing. This provides IR lighting to enhance the images produced by the output video device (monitor), which might otherwise lack clarity due to the low levels of lighting.

The monitor provides the user with a video display of the image gathered by the camera as well as a preprogrammed display of an image previously selected and stored in circuitry in the monitor. The monitor is provided with circuitry and software so that the preprogrammed image may be superimposed on the image received from the camera, so that a comparison of the two images produced in the monitor may be made.

When the camera is properly set up in such a manner to view the gap between a pair of mill rolls, an image may be produced in the monitor of the actual configuration of the rolls, and their associated gap. Any offset between the rolls will become immediately apparent and the roll gap may be adjusted to any desired value by viewing the image produced in the monitor. If it is desired to check for wear on the mill is rolls, the actual image of the roll profile may be immediately compared to a superimposed preprogrammed image overlaid on the actual roll image to determine if the roll profile is satisfactory or if it is not, to exchange the rolls for a new set.

To begin the alignment procedure, the alignment of the video camera of this invention must be checked to see that it is in suitable condition for alignment of the guide assembly and the rolls of the mill. To check the camera alignment the camera is mounted on a special base member which itself is mounted on the bed of a test bench.

The bench is made to be an exact replica of the bed of a steel mill assembly where a guide is to be ultimately mounted on a base plate to guide the work product into the reducing rolls of the mill.

The camera is mounted on the special base member of the test bench and a "test" target (the position of which is known to be at a predetermined axial position on the test bench) is mounted on the test bench bed to check the camera alignment. The camera alignment is checked by means of the image of the "test" target produced in the video monitor. The monitor may be preprogrammed with a display in the form of crosshairs to enable swift determination of the camera alignment. If the "test" target is correctly portrayed on the monitor, the camera is in correct alignment and the target may be removed from the test bench and the camera may then be used to align a guide assembly which will now be mounted on its special mounting base on the test bench. (If the camera and "test" target are not properly aligned it will be assumed that the camera has lost its alignment and must be sent to a laboratory for suitable adjustment).

When it has been determined that the camera is in correct alignment with the "test bed", the guide assembly which is to be used in the steel mill is now mounted on the bench at a second station. The camera (now in the prescribed alignment with the bench bed) is now focused on the rolls of the guide assembly. The gap profile is plainly shown on the monitor and the gap may be adjusted and precisely set using the video image provided by the monitor. When the operator is satisfied with the setting of the guide assembly, the camera and guide assembly are removed from the bench.

The camera is now mounted on a saddle of the mill bed where the guide assembly is to be ultimately mounted. The camera is aimed and focused on the gap existing at the main reduction rolls. The gap existing at the main rolls may be magnified and the preprogrammed image of the roll profile may be superimposed upon the image of the rolls as seen by the camera in order for the mill operator to make a judgment comparison of roll wear. The image on the monitor will give a good indication of the setting of the main rolls, or if further adjustment of the main rolls is required. The axis of the main rolls may not be coplanar and adjustment of the main rolls may have to be undertaken. The image produced by the monitor is a convenience for mill roll adjustment.

At the same time the monitor may show that although the axis and the roll profile of the main rolls is satisfactory, the axis of the camera does not appear to be aligned with the axis of the main reducing rolls (i.e. the mill axis). If this situation exists the operator will instantly know that the saddle on which the camera is mounted is requires adjustment. This saddle is provided with a lateral adjustment to permit the camera to be laterally shifted (yaw axis) until it is in perfect alignment with the axis of the mill.

When the camera axis and the mill axis are coincident as seen on the monitor, the camera may be removed from the saddle and the previously aligned guide assembly is mounted on the saddle in place of the camera. Because of the previous calibration of the guide achieved on the "bench", it will be found that the guide is now in perfect alignment with the mill axis.

BRIEF DESCRIPTION OF THE DRAWINGS

FIG. 1 is a plan view of the test bench assembly of this invention.

FIG. 2 is an elevational view of the test bench assembly of FIG. 1.

DESCRIPTION OF THE PREFERRED EMBODIMENT

Figure 3:
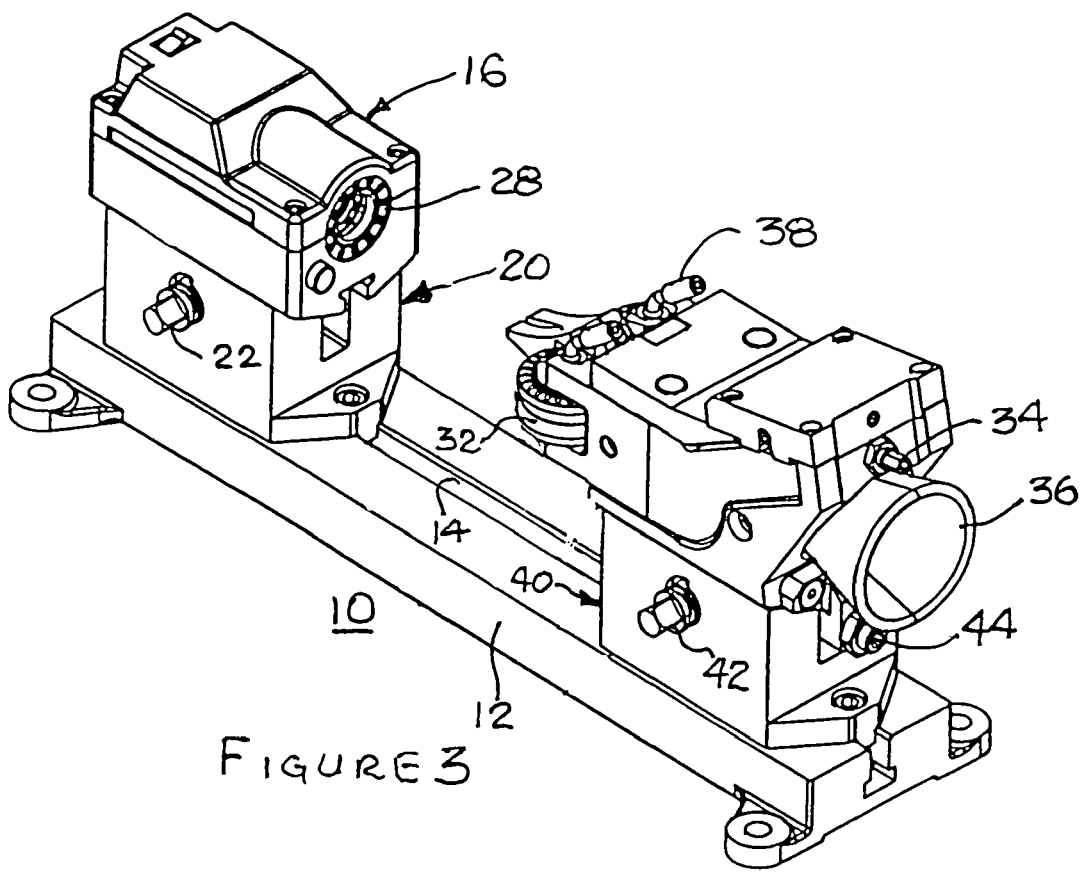
FIG. 3 is a perspective view of the test bench assembly of FIGS. 1 and 2.

The test bench mounted apparatus 10 of this invention is shown in FIGS. 1-3. Bench bed 12 replicates the bed of one stage of a multi-stand reducing steel mill. The bed 12 is provided with a standard "T" groove 14 for mounting various components about to be described on the bed 12.

At one end of test bench 10 a camera 16 on is mounted on pedestal 20. Camera 16 is housed in a robust housing 18 to protect the somewhat fragile components housed in camera 16. Pedestal 20 has a clamping adjustment screw 22 to rigidly clamp camera 16 in place on pedestal 20 of the bench 10. Camera 16 is also provided with a focusing adjustment provided by knob 24.

Figure 4:
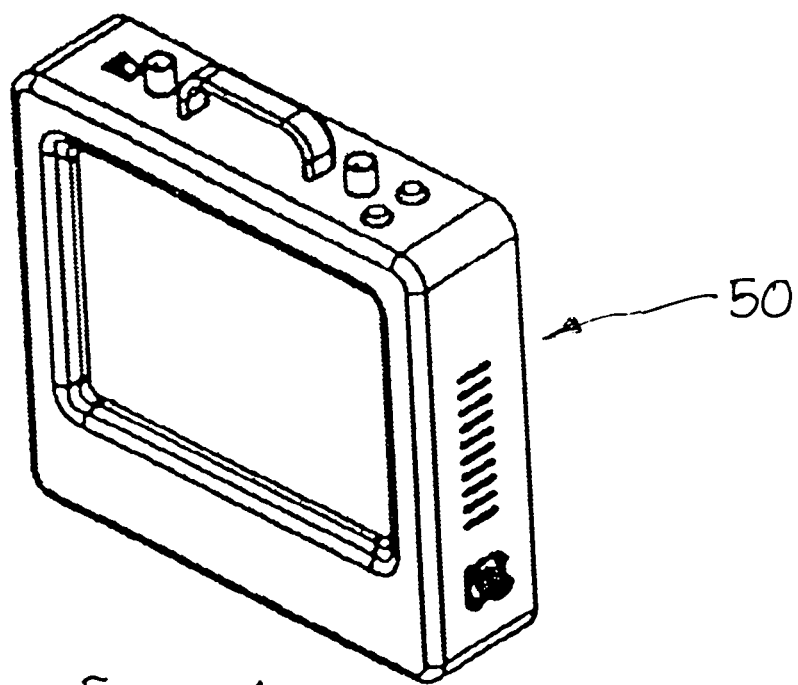
FIG. 4 is a perspective view of a display device.
Figure 5:
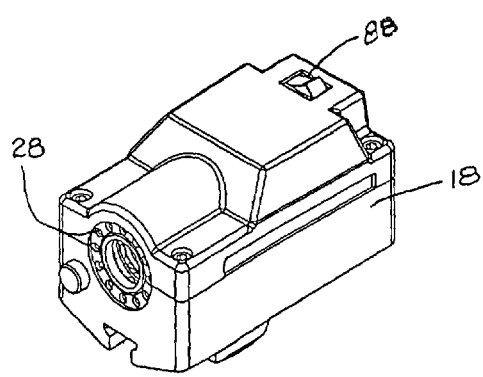
FIG. 5 is a perspective view of camera 16.
Figure 6:
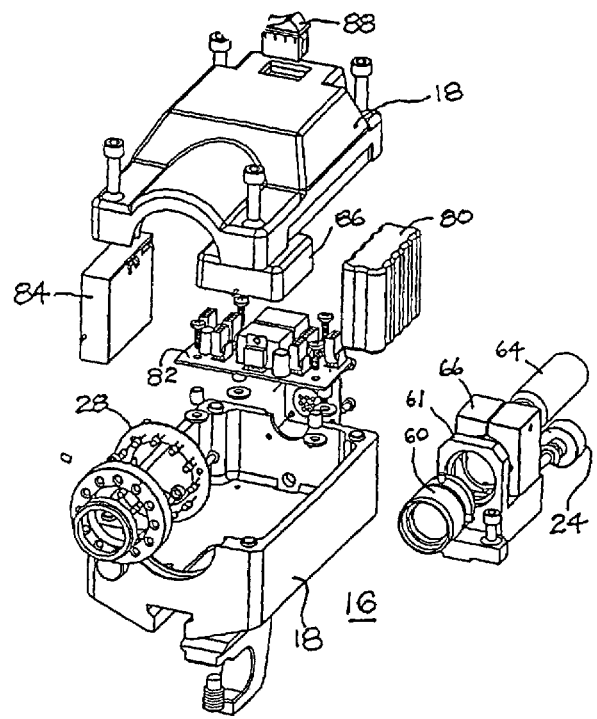
FIG. 6 is an exploded perspective view of camera 16.
Figure 7:
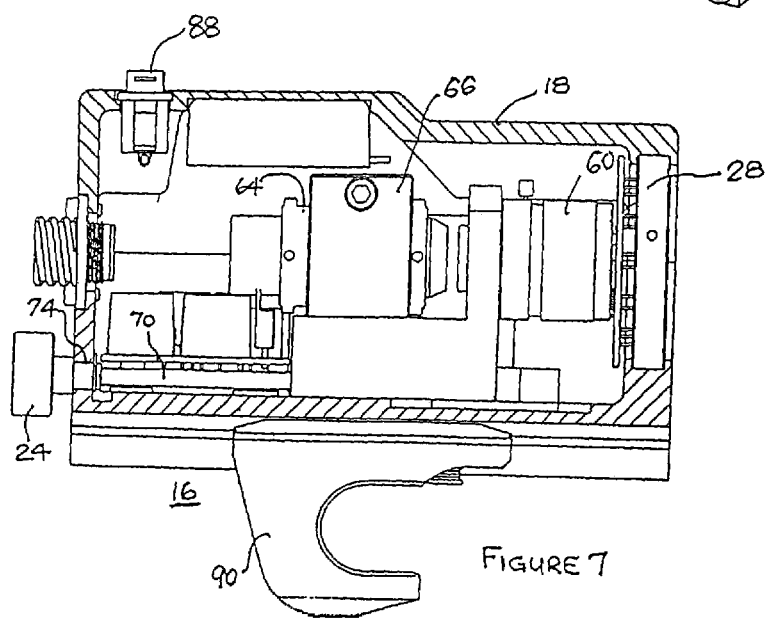
FIG. 7 is an elevational sectional view of camera 16.
Figure 8:
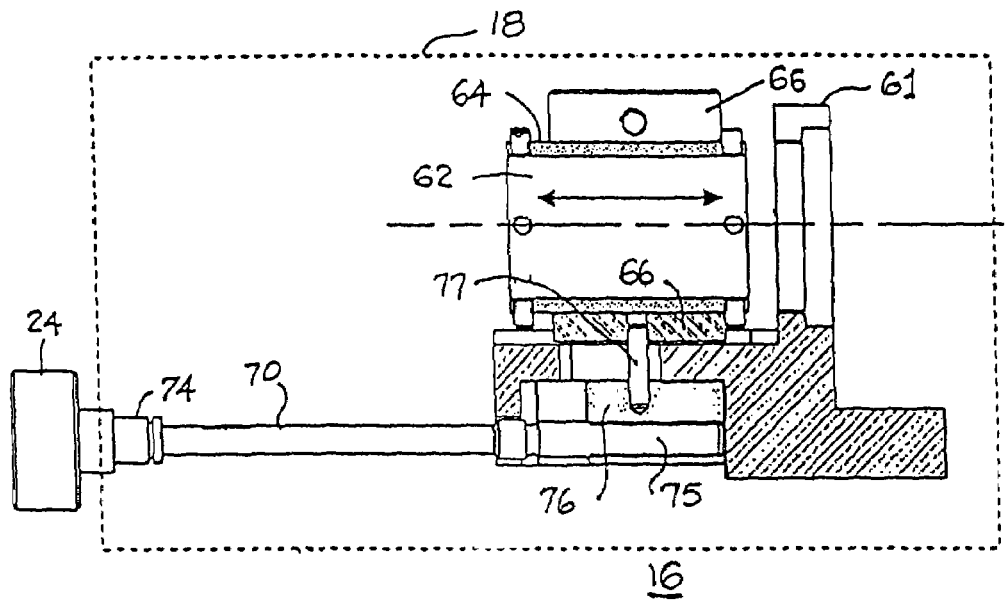
FIG. 8 is a schematic illustration of camera 16.

Preliminary checking of the camera 16 on pedestal 20 is provided by mounting a temporary "test" target (not shown) mounted on the bed 12. The test target is provided with a predetermined test pattern centered on the axis of the test bench. The camera 16 is focused on the test pattern of the target to produce an image on the video monitor (shown as 50 in FIG. 4). If the monitor shows the test pattern correctly portrayed on the monitor 50 the calibration of the video camera 16 on the pedestal 20 is deemed to be within tolerance and video inspection of the guide assembly may now be undertaken.

The temporary "test" target is next removed from bed 12 and the camera 16 is now focused on the roller opening existing in guide assembly 30 mounted on the other pedestal 40. The gap existing between the rolls 32 of guide assembly 30 may now be conveniently displayed on monitor 50. The roll gap of the guide assembly 30 may be accurately adjusted by means of adjustment screw 34, and because of the magnification provided on monitor 50 the adjustment is swift and accurate. Guide assembly 30 shown having rollers 32, gap adjusting screw 34, funnel entrance guide 36, and coolant pipes and nozzles 38 is mounted on pedestal 40 on the bed 12 of bench 10. Guide assembly 30 is held firmly in place by clamping eccentric 42.

A monitor 50 is provided to display the image as produced by camera 16. Camera 16 and monitor 50 are both self-contained powered wireless devices utilizing rf data transmission.

Camera 16 may be provided with an infra red illumination devices 28 surrounding the camera lens to improve the quality of the image displayed on monitor 50 under low level lighting conditions.

The apparatus functions as follows: After adjusting the rolls 32 of the guide assembly 30 to the desired setting while being mounted on pedestal 40, the guide assembly is now removed from pedestal 40 and camera 16 is also removed from pedestal 20 and taken to the mill where the guide assembly 30 is to be ultimately installed.

Camera 16 is now installed in the mill on the saddle on which the guide assembly is to be ultimately mounted. It will usually be found that the saddle on which the camera 16 is mounted will require adjustment in the "yaw" axis. (It is to be remembered that the physical characteristics of the mill have been carefully duplicated in bench bed 12 so that the camera 16 and guide assembly 30 may be quickly and easily installed in the mill knowing that both items have been previously correctly aligned.) When the camera apparatus 16 has been installed and securely fastened to the saddle attached to the mill bed, the camera 16 is energized to produce a video image of the gap existing between the reduction rollers of the mill on monitor 50. Camera 16 may have to be refocused to sharply define the roll gap. IR illumination may be supplied to the gap by devices 28 on camera 16. At this time the gap image displayed on video monitor 50 may be compared with the image of the rolls and roll gap previously stored in the overlay circuitry of the monitor. The gap image may show that the planes of the rolls are not coincident; the gap between the rolls may be too large or too small; or it may be found that the camera itself may not be correctly positioned on the roll axis; or the surface profile of the rolls has deteriorated sufficiently to require roll replacement. At this time adjustments may be made to change the position of the mill rolls to correct for gap misalignment, and/or to the saddle upon which the camera is mounted to permit lateral positioning of the camera 16 on the mill axis until the correct alignment of the camera on the mill axis is achieved. At this time the position of the saddle will be locked.

The camera 16 may now be now removed from the locked saddle of the mill bed and the guide assembly 30 may now be installed on the mill saddle where the camera 16 was previously mounted. Because of the previous calibration of the camera 16 and guide assembly 30 on the test bench, the guide assembly 30 will now be found to be perfectly aligned with the mill axis and the gap existing between the guide rollers 32 will be that which was set previously on bench 10.

The characteristics of the camera 16 used for the device are best described in FIGS. 5, 6, 7 and 8. Camera 16 has a housing 18 in which the CCD device 62 is housed. CCD device is held in a bezel 64 which is held in place in carrier block 66 is movable laterally with respect to lens assembly 60. The CCD device 62 moves with bezel 64 and block 66 when control knob 24 which is mounted on shaft 70 is twisted. Shaft 70 is mounted in camera 16 in bearings 74. End 75 of shaft 70 remote from knob 24 is threaded to engage a block 76 which moves back and forth within camera when shaft 70 is twisted. A dowel 77 is secured to block 76 to move block 66 back and forth in concert with block 76 on stationary base 78. Movement of block 66 causes bezel 64 to move with it which in turn causes the CCD device 62 to move back and forth with respect to the lens 66. Bezel 64 has provision for adjustably mounting the CCD device therein (8 set screws).

The camera is supplied with a battery pack 80, electronic circuit board and associated components 82, a transmitter 84 and an antenna 86. An on-off switch 88 is supplied to energize the camera 16. Hook 90 allows the camera to be securely mounted on bench 12 or other platform such as the guide saddle in a steel mill.

The camera 16 and monitor of this invention must be robust and capable of self energization to be operable at remote locations where sources of power may be difficult to locate. Both devices may be in communication by wireless electronic transmission or a cable may link the camera and monitor if desired.

It is imperative that camera 16 be capable of being mounted on the bed or bench at two positions 180 degrees apart i.e. facing in opposite directions in order to provide correct alignment of reduction rolls and the guide rolls.

The illumination of the critical mill parts with IR is invaluable; with the magnification it is possible to view the image on monitor 50 enlarged many times and with the added illumination provided by the IR source, the adjustment of the rollers may be extremely precise.

Figure 9:
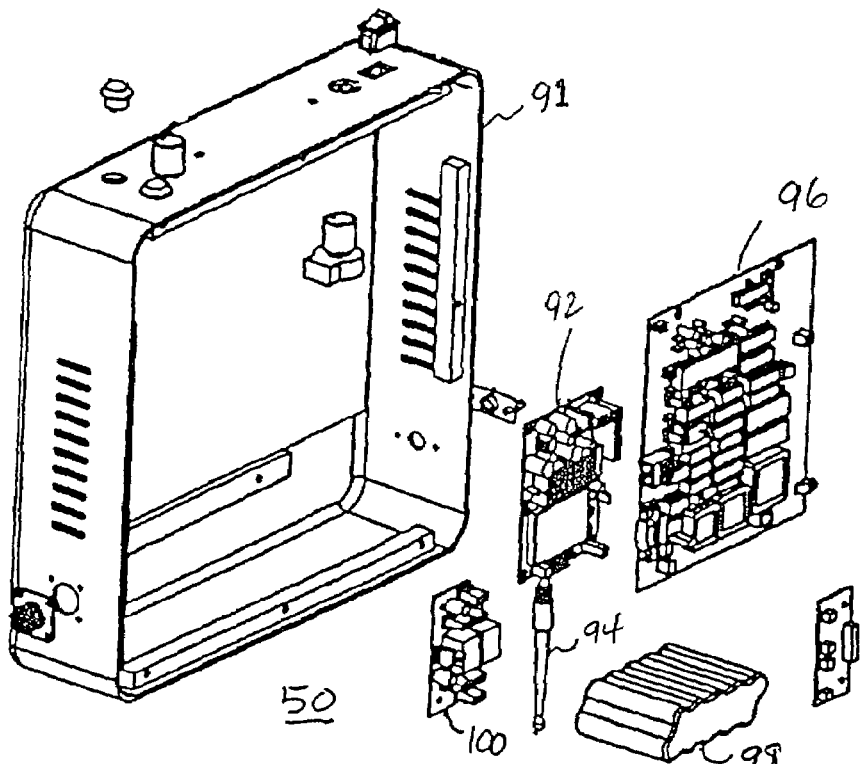
FIG. 9 is an exploded view of the monitor of FIG. 4.

The monitor 50 is shown in an exploded view of FIG. 9 to illustrate some of the critical parts necessary for successful operation of this invention.

Monitor 50 is shown having a case 91 in which the circuitry is mounted. This circuitry includes a receiver board 92 shown with antenna 94 attached thereto, and a video overlay board 96 for producing a preprogrammed overlay image, a battery pack 98 and an interconnect board 100.

The camera image is captured and reproduced in receiver board 92 and is displayed on a video reproduction device (not shown in FIG. 9).

It will be seen that this invention permits the video camera and guide apparatus to be previously aligned and set before being installed on the steel mill itself. This feature alone preserves valuable mill operating time. The alignment and profile inspection of the main rolls of the steel mill is an added bonus made possible by the magnification provided by the monitor. The instant comparison of the roll profile with a previously programmed profile of the desired roll profile is invaluable for the determination of when the steel mill rolls must be replaced.

What is claimed:

1. A method of aligning a guide assembly with the axis of rolling of a mill stand of a steel mill comprising:
    providing a test bench having a corresponding axis and other physical characteristics of the guide mounting bed of said steel mill,
    providing a pair of pedestals mounted in a predetermined distal relationship on said test bench having predetermined physical characteristics suitable for mounting a guide assembly thereon;
    providing a self contained wireless digital camera having a suitable arrangement for mounting on one of said pedestals,
    providing a target temporarily mounted on said test bench having a target located on said axis;
    providing a remotely located video monitor capable of receiving signals from said self contained video camera to display an image generated by said camera;
    adjusting said camera and one of said pedestals until said monitor shows an image indicating that said camera is now located on said test bench axis.

2. A method as claimed in claim 1 where said target is removed from said test bench and
    steel mill guide means is mounted on the other of said pedestals,
    acquiring an image on said monitor of said steel mill guide means provided by said camera,
    adjusting said other of said pedestals until said image of the video monitor indicates that said steel mill guide means is axially located on said test bench.

3. A test bed for axially aligning equipment along an axis correspondent to the axis found in a steel mill comprising:
    a bed duplicating the dimensions of guide mounting apparatus of a steel mill;
    a pair of pedestals being mounted in a predetermined distal relationship on said bed;
    a test target having target means temporarily located on the axis of said test bed;
    a camera mounted on one of the pedestals aimed at said test target;
    adjustment means on said one of said pedestals to permit adjustment of said one of said pedestals in a horizontal plane to permit said camera to acquire said test target.

4. A test bed for axially aligning selected equipment along an axis correspond to the axis found in a steel mill comprising;
    a bed duplicating the dimensions of the bed of a steel mill,
    a pair of pedestals being mounted on said bed in a predetermined distal relationship,
    a camera mounted on the axis of said bed on one of said pedestals,
    a guide for said steel mill being mounted on the other of said pedestals,
    adjustment means on said other of said pedestals for adjusting said guide for movement in a horizontal plane.

* * * * *